Jan. 22, 1963     J. E. DRAIM ET AL     3,074,321
TRANSPORTATION OF A FLOATABLE ROCKET VEHICLE
Filed May 23, 1960     2 Sheets-Sheet 2

INVENTORS
JOHN EMERY DRAIM
BY CHARLES E. STALZER

ATTORNEY 3,074,321
TRANSPORTATION OF A FLOATABLE ROCKET VEHICLE
John Emery Draim, 1436 W. Beverly Drive, Oxnard, Calif., and Charles E. Stalzer, 2221 Grandview Drive, Camarillo, Calif.
Filed May 23, 1960, Ser. No. 31,243
2 Claims. (Cl. 89—1.7)
(Granted under Title 35, U.S. Code (1952), sec. 266)

The invention described herein may be manufactured and used by or for the Government of the United States of America for governmental purposes without the payment of any royalties thereon or therefor.

The present invention relates to the transportation of a floatable rocket vehicle and more particularly to transporting on water a floatable rocket vehicle which when unrestrained will float upwardly in the water.

Heretofore, little attention has been given to the launching of a rocket vehicle in a body of water. The method now used for launching pay loads from the earth is from a land-based facility which inherently requires extensive support equipment costing three to five times as much as the rocket vehicle itself. Phenomenal safety is attributable to launching a rocket vehicle from water since any explosion due to a malfunctioning of the rocket vehicle will be absorbed by the surrounding water. A rocket vehicle which is capable of being launched from water is fully described in a U.S. patent application Serial No. 27,459, filed by John E. Draim and Charles E. Stalzer, and it is to the transportation of such a rocket vehicle that the present invention is directed. By transporting and launching a rocket vehicle on water, literally 70 percent of the earth's surface becomes a potential launch pad. However, two known problems are inherent in getting the rocket vehicle to the desired launch site; namely, (1) making the transition of the rocket vehicle from land to water, and (2) eliminating the corrosion of the rocket vehicle while being towed. The present invention eliminates the first problem by constructing or placing the rocket vehicle in a drydock and then mounting a predetermined amount of buoyant material at a preselected position on the rocket vehicle so that it will float substantially horizontal when the drydock is flooded and then after flooding, towing the rocket vehicle to a body of water. The problem of corrosion is substantially eliminated by providing for a submerged tow of the rocket vehicle. This is accomplished by downwardly biasing the nose end of the rocket vehicle in a particular manner so that the rocket vehicle digs a slight amount into the water as it is towed through the water.

Accordingly, an object of the present invention is to provide a method of transporting a rocket vehicle from land to a water launch site.

Another object is to minimize corrosion of a rocket vehicle when it is being towed at sea.

Other objects and many of the attendant advantages of this invention will be readily appreciated as the same becomes better understood by reference to the following detailed description when considered in connection with the accompanying drawings wherein.

Figure 1:
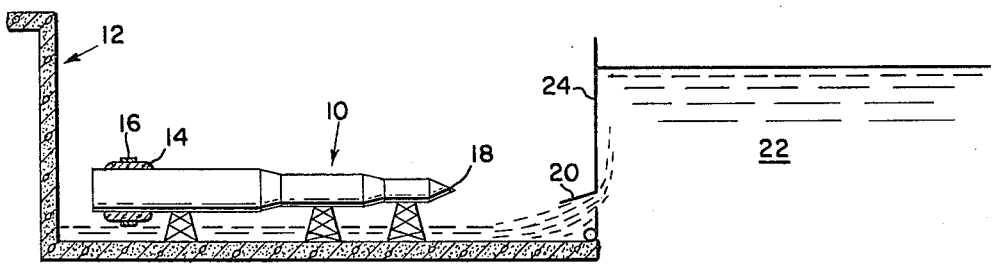
FIG. 1 is a side view of a rocket vehicle within a drydock, the rocket vehicle being shown partly in cross-section.
Figure 2:
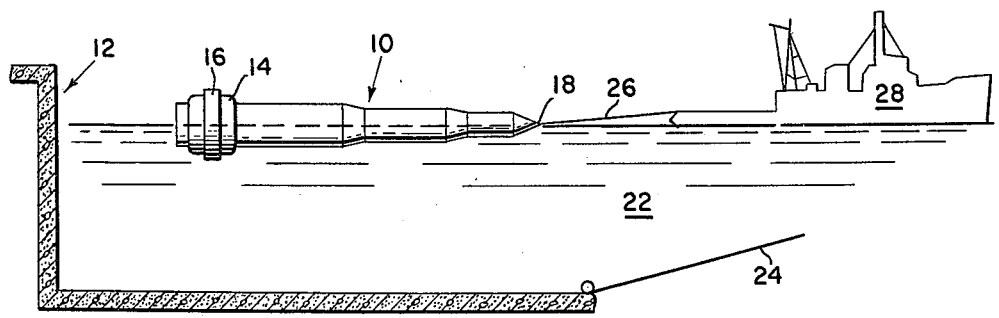
FIG. 2 is a side view of the rocket vehicle being towed out of a flooded drydock.

Referring now to the drawings wherein like reference numerals designate similar parts throughout the several views, there is shown in FIG. 1 a rocket vehicle 10 which has been constructed in a drydock 12. The rocket vehicle 10 has a buoyant jacket 14 which is held in place by a split ring retainer 16, the latter being joined by any suitable means such as riveting or spot welding. The rocket vehicle 10, exclusive of buoyant jacket 14 and split ring retainer 16, has a positive metacentric height; i.e., the center of buoyancy of the rocket vehicle is closer to a nose end 18 than is the center of gravity of the rocket vehicle. The rocket vehicle 10, exclusive of the buoyant jacket 14 and the split ring retainer 16, will float upright in a body of water and for a full description of the construction of the rocket vehicle reference is made to a U.S. patent application, Serial No. 27,459, filed by John E. Draim and Charles E. Stalzer. It is intended that the buoyancy of the buoyant jacket 14 and its position on the rocket vehicle be such that the rocket vehicle will assume a substantially horizontal position on water as shown in FIG. 2. After mounting the buoyant jacket 14 and the split ring retainer 16 on the rocket vehicle 10, the drydock 12 is flooded by opening door 20 thus allowing water from a body of water 22 to float the rocket vehicle. After floating the rocket vehicle 10, as shown in FIG. 2 gate 24 of the drydock is opened and a towline 26 from a towing ship 28 is attached to the nose end 18 of the rocket vehicle. The towline 26 can be attached to the nose end 18 by any suitable means such as by looping the towline 26 through an eye (not shown) on the nose end of the rocket vehicle after which the towline can be tied or strapped on itself. After attaching the towline 26 the rocket vehicle is towed clear of the drydock into the body of water 22 by the ship 28. When the water is of a sufficient depth, towing is stopped and the split ring retainer 16 and the buoyant jacket 14 are removed from the rocket vehicle 10 whereupon the rocket vehicle will tend to upright itself in the water. The rocket vehicle is now ready to be prepared for towing under water to a predetermined launch site.

Towing the rocket vehicle 10 under water is accomplished by downwardly biasing the nose end 18 of the rocket vehicle with a ballast plug 30. The ballast plug 30 has a releasable eyelet 32 which encircles the towline 26 thus allowing the ballast plug 30 to slide along the towline. The ballast plug 30 is positioned anywhere along the towline 26 by means of a cable 34 which is attached at one end to the eyelet 32 and at the other end to a winch (not shown) on the ship. The weight of the ballast plug 30 and its position on the towline 26 is to be such that the rocket vehicle 10 assumes a slight negative angle $\theta$ (less than 20 degrees) with respect to a horizontal, the exact number of degrees of the angle depending upon the desired towing depth for a particular towing speed. By maintaining angle $\theta$ at the proper number of degrees below a horizontal the upward pull of the towline 26 on the rocket vehicle and the upward push of the water on the lower portion of the rocket vehicle is equalized by the downward push of the water on the upper portion of the rocket vehicle resulting in stabilization of the rocket vehicle at a predetermined towing depth. If a change in angle $\theta$ were desired for any particular towing speed, this change could be brought about by changing the position of the ballast plug 30 on the towline 26 or by changing the weight of the ballast plug 30. Accordingly, if it was desired that angle $\theta$ be increased negatively the cable 34 would be slackened a slight amount to position the ballast plug 30 closer to the nose end 18 of the rocket vehicle, thereby decreasing the upward pull of the towline 26 on the nose end 18.

Figure 4:
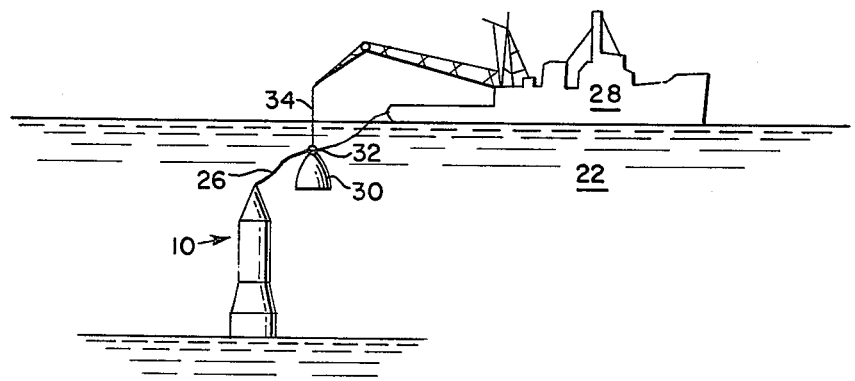
FIG. 4 is a perspective view of the rocket vehicle and a towing ship.
Figure 5:
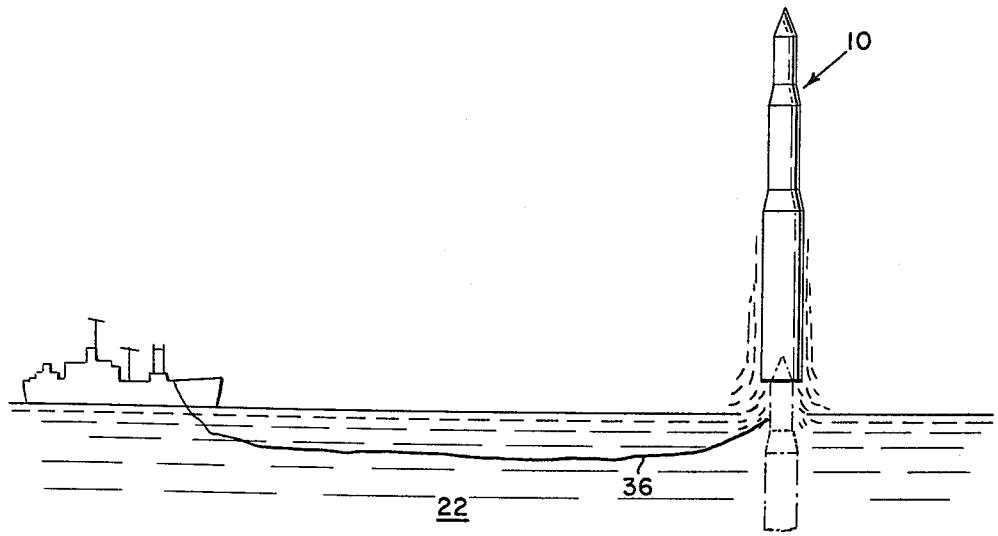
FIG. 5 is a perspective view of the rocket vehicle being launched by a towing ship.

After towing the rocket vehicle 10 to a desired launch site, tension on the towline 26 is removed by stopping the movement of the ship and lifting the ballast plug 30 as shown in FIG. 4. When the tension on towline 26 is removed the rocket vehicle 10 will immediately upright itself in the water to a stable launching position. The towline 26 is removed from the rocket vehicle and a control line 36 is attached from the ship to the rocket vehicle. At this time the rocket vehicle becomes ready for launch from a water launch site. When the time is appropriate the control line 36 fires the rocket vehicle 10 whereupon the rocket vehicle commences its flight above the earth as shown in FIG. 5.

It is now evident that the invention has made the sea and other bodies of water potential highways for the rocket vehicle described and has substantially lessened the problem of corrosion of the rocket vehicle by providing for a submerged tow. Further, the invention provides a convenient method of making the transition of the rocket vehicle from a land location to a water location or for transporting the rocket vehicle in shallow water.

Figure 3:
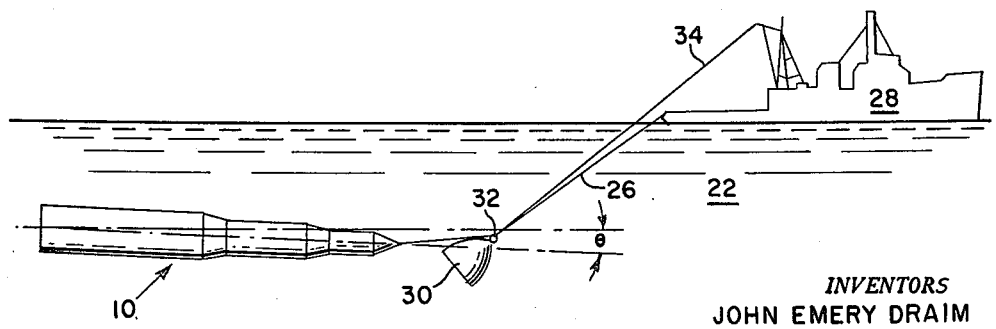
FIG. 3 is a side view of the rocket vehicle being towed under water.

Obviously, many modifications and variations of the present invention are possible in the light of the above teachings. For instance, instead of using the ballast plug 30 as shown in FIG. 3 for downwardly biasing the nose end 18 of the rocket vehicle, it is contemplated that a controlled paravane slidably attached at both ends to the towline 26 would accomplish the same result. Further, it is contemplated that control vanes on the rocket vehicle itself would downwardly bias the nose end 18 of the rocket vehicle. Also, it is contemplated that the towline 26 could be attached to any point within a certain area behind the nose end 18 of the rocket vehicle without altering the spirit of the invention. It is therefore to be understood that within the scope of the appended claims the invention may be practiced otherwise than as specifically described.

We claim:

1. A method of handling and launching a floatable rocket vehicle having an elongated body, a nose end and a base end and having a positive metacentric height so that it will float upright in a body of water with its nose end above its base end comprising the steps of placing said rocket vehicle in an unflooded drydock, adding buoyancy means to said rocket vehicle while in the unflooded drydock so that the rocket vehicle will float with its longitudinal axis substantially horizontal in water, flooding said drydock, towing the rocket vehicle from the drydock to the body of water, removing said buoyancy means, towing the rocket vehicle through the water to a predetermined launch site, downwardly biasing the nose end of the rocket vehicle with respect to the body of water while being towed to the launch site, allowing the rocket vehicle to assume an upright launching position at said launch site and then firing said rocket vehicle.

2. A method of handling and launching a floatable rocket vehicle having a forward nose end, a base end and a positive metacentric height so that it will float upright for launching purposes in a body of water with its nose end above its base end, comprising the steps of placing said rocket vehicle in the body of water, attaching an end of a towline to the rocket vehicle forward of the rocket vehicle's center of gravity, towing the rocket vehicle to a predetermined launch site, downwardly biasing the towline with respect to the water with a force applied forward of said end sufficient to cause the rocket vehicle to assume a desired towing aspect in the water so that the rocket vehicle will remain in a predetermined submerged state during towing, removing said force on the towline at the launch site so as to allow the rocket vehicle to upright itself and then firing said rocket vehicle.

References Cited in the file of this patent

UNITED STATES PATENTS

| | | |
|---|---|---|
| 717,129 | Sjostrand | Dec. 30, 1902 |
| 984,133 | Giese | Feb. 14, 1911 |
| 1,312,356 | Reid | Aug. 5, 1919 |
| 2,198,907 | Dunajeff | Apr. 30, 1940 |
| 2,245,486 | Little | June 10, 1941 |
| 2,359,366 | Katcher et al. | Oct. 3, 1944 |
| 2,403,036 | Wilcoxon et al. | July 2, 1946 |
| 2,751,703 | Kietz et al. | June 26, 1956 |

FOREIGN PATENTS

| | | |
|---|---|---|
| 1,110,465 | France | Oct. 12, 1955 |